Figure 1:
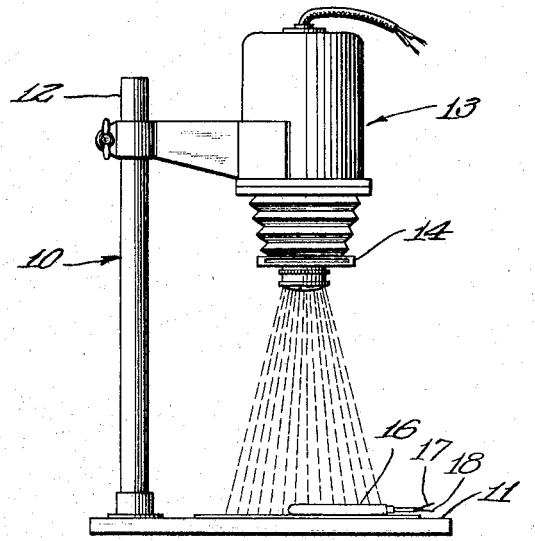

Nov. 15, 1966   R. W. MITCHELL   3,285,125
TEST NEGATIVE AND PHOTOGRAPHIC METHODS
Filed Oct. 16, 1963

INVENTOR.
Robert W. Mitchell
BY
Hill, Sherman, Meroni, Gross & Simpson
ATTORNEYS United States Patent Office 3,285,125
Patented Nov. 15, 1966

3,285,125
TEST NEGATIVE AND PHOTOGRAPHIC
METHODS
Robert W. Mitchell, St. Joseph, Mich., assignor, by mesne assignments, to Heath Company, St. Joseph, Mich., a corporation of Delaware
Filed Oct. 16, 1963, Ser. No. 316,649
12 Claims. (Cl. 88—24)

The present invention deals with improved photographic methods and improved articles for use in such methods.

The present invention is specifically directed to a technique for measuring precisely all types and grades of photographic papers to the end of calibrating or rating such papers with regard to contrast ability. As any qualified photographer knows, photographic printing papers vary considerably in their ability to achieve proper degrees of contrast in the finished print, and thereby to reproduce highlights with the desired accuracy.

The present invention makes use of fine light measuring instruments to make a finished photographic print. The system variables encountered in the printing process are controlled so that the selection of the proper contrast, grade and exposure are accurately determined. Heretofore, such determination was made largely by guesswork, resulting in the wasting of a considerable amount of time and sensitized paper until an acceptable print was achieved.

An object of the present invention is to provide an improved process for calibrating or rating photographic printing papers to predetermine their capacity for reproducing contrast from a given negative.

Still another object of the invention is to provide an improved method for rating photographic printing papers which substantially reduces the time and cost involved in securing an accurate photographic print.

A further object of the invention is to provide an improved test negative which can be used to rate photographic papers in their ability to reproduce contrast.

Other objects and features of the present invention will be apparent to those skilled in the art from the following specific description, taken in conjunction with the attached sheet of drawings.

The overall method of the present invention involves first providing a test negative of a specific design, having a substantially clear light transmiting area and at least one area which is slightly opaque, the difference in shading between the substantially clear area and the slightly opaque area being barely discernible to the naked eye. The test negative is placed in an exposure apparatus, such as an enlarger, and the amount of light passing through the slightly opaqued area is sensed with a suitable light sensitive instrument. The brightness of the exposure apparatus is then adjusted until a predetermined intensity of light transmission is achieved, as determined by a reading on the meter associated with the light sensing instrument.

The test negative also includes individual panels of progressively decreasing opacity. A number of test prints of the test negative are made on each of the printing papers to be calibrated, and the times of exposure are varied for the various test prints until a correctly exposed print is obtained for each of the several papers in which the areas printed from the substantially clear and slightly opaque portions of the test negative are barely distinguishable by the naked eye. When a print of this character has been obtained, the photographer then determines which of the individual marked panels has been printed onto the paper so as to be barely discernible. This determination then tells the photographer the range of contrast achievable in the particular paper being tested under these exposure conditions, all other conditions of developing, and the like, being held constant. Then, the film negative to be printed is placed in the exposure apparatus and the aperture of the apparatus is adjusted until the light transmitted through the clearest part of the negative is the same as the predetermined intensity which was achieved when employing the test negative. The light transmitted through the negative at its most opaque portion or that portion deemed to be the most important white is then determined to find the other end of the contrast scale required for this particular negative. On the basis of these determinations, a printing paper is selected from the previous calibration tests which has the contrast characteristics dictated by the evaluation of the negative to be printed.

A further description of the present invention will be made in conjunction with the attached sheet of drawings which illustrate a preferred embodiment thereof.

Figure 2:
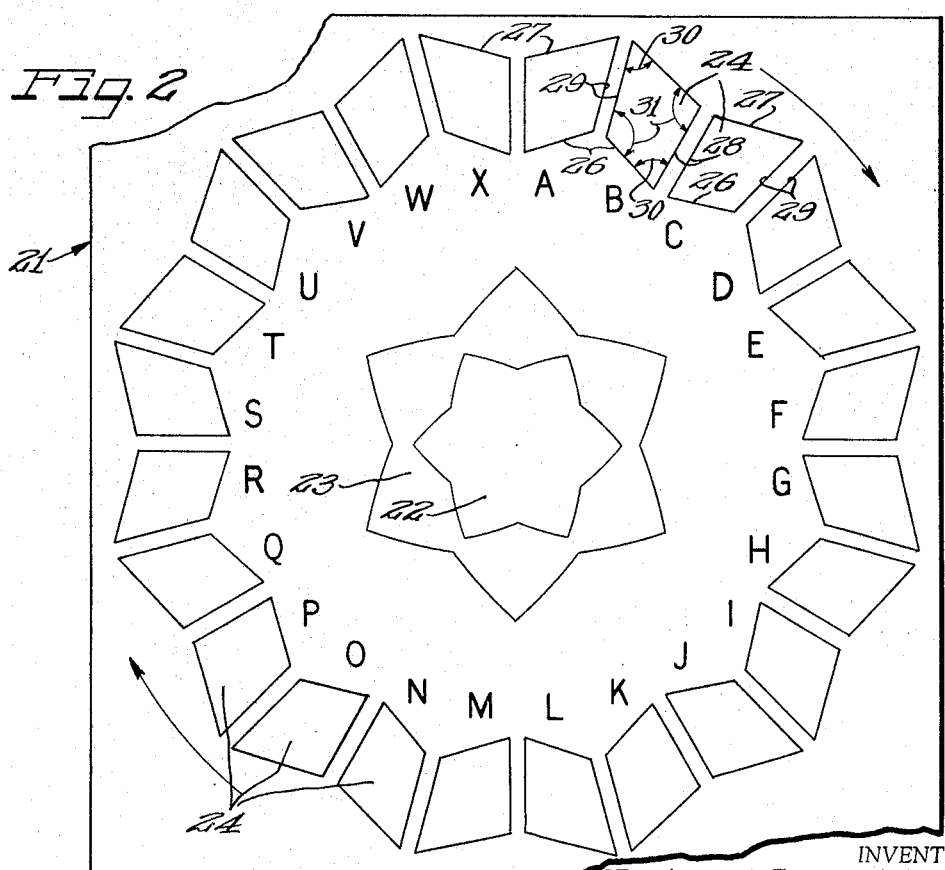

In the drawings:

FIGURE 1 is a view in elevation of an enlarger assembly equipped with a very sensitive light measuring instrument; and FIGURE 2 is a plan view of an improved test negative which can be used in conjunction with the present invention.

As shown in the drawings:

In FIGURE 1, reference numeral 10 indicates generally an enlarger including a baseboard 11 and an upright standard 12 on which the enlarger assembly generally indicated at reference numeral 13 is adjustably held. The enlarger 13 may, of course, be any conventional type enlarger which includes a film carrier 14 and means for adjusting the size of the aperture associated with the projecting lens system, and/or the brightness of the light source.

The light sensitive means employed in connection with this invention is a highly sensitive one and may be of the projection densitometer type, including a probe 16 which is selectively positionable in selected areas of the film being projected to determine the light density at various points along the film. A pair of leads 17 and 18 connect the probe 16 to the remainder of the circuit which usually includes a recording instrument such as a meter (not shown).

The original calibration of the photographic paper is made by the use of a test negative of the type shown in FIGURE 2 of the drawings. The test negative 21 includes a centrally disposed clear area 23 in the shape of a star which is substantially completely transparent to the passage of light. Disposed within the star is a second star constituting a very slightly opaque area on the negative, the difference in shading between the opaque areas 22 and that of the clear, transparent area 23 being just barely discernible to the eye.

The test negative 21 also includes individual panels 24 of varying opacity. In the particular arrangement shown in FIGURE 2 of the drawings, twenty four such panels are provided, and each has been identified with a letter of the alphabet extending from A to X. The individual panels 24 are arranged along a common circumference with respect to the central, clear area 23 and are radially spaced therefrom. In the arrangement shown in FIGURE 2, panel A is the deepest gray, panel B is very slightly lighter, and so on, down to panel X which is sufficiently transparent to print out as a relatively dark shade of gray. The gradations between the shades of the panels A through X need not be made with mathematical precision as long as there is a discernible difference in shading between each of the panels.

In the first step of evaluating a photographic paper, the test negative 21 is placed in the enlarger 10 and the probe 16 is positioned on the baseboard directly beneath the slightly opaqued area 22 of the test negative 21. The aperture of the enlarger lens or brightness of light source is then adjusted until the meter associated with the probe 16 registers a predetermined amount of deflection. This deflection, representing a specific degree of light intensity, is then used as a fixed datum for all subsequent comparisons.

Next, the probe 16 is positioned under each of the panels A through X of the test negative and the values recorded on the meter corresponding to each of the gray panels of varying intensity are recorded on a chart.

Now, the paper may be evaluated for its contrast characteristics. Several samples of the paper are employed for securing test prints. Each paper has a recommended exposure time set by the manufacturer and it is advisable to make several prints at exposure times slightly less than and slightly greater than the recommended time. For example, if the manufacturer recommends an effective exposure time of 8 seconds, then a series of prints may be made at exposure times of 6, 7, 8 and 9 seconds. After exposure, the test prints are developed according to standard developing techniques using precise and reproducible conditions of concentration, temperature and developing times. When the prints have been developed and dried, they are taken into daylight or under a normal room light source where they are examined to determine the character of reproduction in the central area defined by the clear area 23 and the area 22. That print is selected which has been exposed with exactly enough light to render the black area defined by the outer star of the negative discernible to the naked eye from the very slightly gray area printed from the slightly opaque area 22 of the negative.

Next, the operator examines the print which fulfills these conditions and determines which of the test panels from A to X has been reproduced to the extent of having its outline barely discernible against the white background of the test prints. This identifying letter is then entered on the chart and used for future reference. For example, if the operator had initially selected a so-called "No. 2" paper and the print which he found to be satisfactory from the standpoint of delineating the deep gray central area from its black border was made at an exposure of 9 seconds, and the first clearly defined gray panel was that identified at reference K, then he could mark that particular supply of printing paper with the designation "2–K–9." From then on, the operator would have complete information as to the exposure time and contrast ability for that particular supply of paper. Each grade of paper in stock would be so calibrated.

Now, in making a print from a particular negative, the operator first determines the brightness or contrast range of that negative. This is done by placing the negative in the enlarger 10 and adjusting the enlarger aperture or brightness of light source until the light transmission indicated by the probe 16 is the same as that achieved by the use of the test negative, i.e., the preselected fixed datum point. It is advisable to measure the brightness in many places of the negative to make sure that the one he has chosen is, in fact, the clearest area of the negative under test.

After this point has been established, the operator then scans the negative with the probe to read the darkest important areas of the negative or the highlights of the picture. By carefully scanning the projected image, the operator will be able to discover the darkest or lowest reading area of the negative. At this time, the operator should decide whether this is to be the highlight of this picture, as some negatives have areas such as heavy cloud patterns in the sky or backlighted highlights which need not have detail as far as the basic print is concerned. These areas can be disregarded when the highlight value is measured. Accordingly, these areas can then be overprinted after the basic exposure is made. By and large, however, the operator will select that area on the negative which has the least light transmission through it and make a record of the actual reading on the meter. Then, by his previous measurement of various grades of printing paper, he can select that type of printing paper which will exactly suit the contrast requirements of this particular negative.

There are, of course, innumerable variations of technique which are possible with the system of the present invention. Sometimes, the photographer would prefer not to have completely black areas in the final print, but would rather have a shade of gray as the darkest area. In this instance, he would merely work from the high end of the brightness scale rather than the low. He could then scan the test prints which he had already made other than the one selected for making the chart and from them select that print which indicated a brightness range from the correct highlight to the desired shadow area.

It is important, of course, that the prints be developed under exactly the same conditions as employed for the initial evaluation of the printing paper, using the test negative. It is also advisable to make certain that the line voltage supplying the enlarger and the light sensing instrument be constant. This can be achieved through the use of a constant voltage transformer. It is also desirable to use an electronic timer on the enlarger to insure complete accuracy. It is also advisable to provide a fine control on the aperture control ring of the enlarger and for brightness of the light source so that extremely fine adjustments can be made in brightness. The temperature of all developing solutions should be kept constant either by means of a constant temperature controlled sink or water jackets of the immersion type. In addition, a standard developer and developing technique should be employed so that as many variables as possible are eliminated.

With the technique of using a fixed datum of light measurement, the photographer has the facility of quickly repeating pictures on more than a single paper type or grade without any enlarger adjustment.

The use of the two toned central area employing a slightly grayed area and a completely clear film makes it possible to establish extremely accurate exposure conditions, as only the proper exposure will indicate a separation of the two tones.

Numerous mechanical variations are possible within the practice of the present invention. For example, the chart or graph which records the results of prints made with the test negative can be made as a series of sliding tabs or rods or in slots in a lighted box behind which there is located the calibrated series of lines corresponding to the values indicated on the meter face. The chart could also be a series of pressure sensitive tabs which can be applied to a transparent overlay on the meter face or dial. It could also take the form of a removable panel upon which the pertinent data could be written. A chart could also be incorporated in the meter itself in any of a variety of manners.

The specific form of test negative illustrated in FIGURE 2, however, represents an optimum arrangement and shape which in and of itself is believed to be a part of the subject invention. Thus, the test negative more specifically constitutes a thin sheet form member 21 preferably having the thickness of a piece of film with sufficient rigidity and strength to facilitate manipulation thereof as described above.

A test negative film 21 could be mounted in a masking member or in a mounting board. As shown in FIGURE 2, however, the test negative takes the form of a piece of photographic film of a desired thickness and rigidity and initially having a light-sensitive emulsion thereon. By the use of cutouts and varied exposure, a graduated series of panels are provided, each representing a different shade of gray in a completed print.

Disposed inwardly within the margins of the sheet form member 21 is an annular row of panels 24 consisting of plural but individual plaques or areas labelled A through X, each being identical to the other in plane area and all being particularly characterized by the geometrical configuration of a rhomboid having a short leg 26 and a long leg 27 parallel to one another and a pair of non-parallel legs 28 and 29. Each leg 28 and 29 is joined to a corresponding adjoining parallel leg 26 and 27 at either an acute angle 3 or at an obtuse angle 31.

All of the short legs 26 face radially inwardly and all of the long legs 27 face radially outwardly. Moreover, each one of successive pairs of panels 24 is disposed in inverted relation with respect to its adjoining mate so the legs 28, 28 and legs 29, 29 of successive adjoining panels 24 are disposed in parallel spaced adjacency.

The resulting disposition is a serrated type of appearance wherein a plurality of radially projecting apices is formed by pairs of panels, which appearance and disposition greatly facilitates comparison inspections and accurate detection and evaluation of graduated tone areas, even though of relatively slight differences of opacity.

The test negative 21 is further characterized by a centrally disposed star-shaped panel shown generally at 23 and which is in concentric relation to the annular row of panels 24.

Wholly confined within the central body portion of the star-shaped panel 23 is a second star-shaped panel 22 complementary in shape and concentrically disposed in relative position, but offset circumferentially so the radially outermost peaks of the star panel 22 are disposed radially inwardly adjacent the radially innermost peaks of the star panel 23.

Such shape and arrangement greatly facilitates detection and evaluation of the gradations of gray necessary to the initial steps in the methods practiced according to this invention.

Although minor modifications might be suggested by those versed in the art, it should be understood that I wish to embody within the scope of the patent warranted hereon all such modifications as reasonably and properly come within the scope of my contribution to the art.

I claim as my invention:

1. The method of rating a photographic printing paper which comprises exposing a test negative onto a paper to be rated, said test negative having a substantially clear light transmitting area, at least one area adjoining said substantially clear area which is slightly opaque, and a series of individual panels of varying degrees of density, varying the time of exposure until a positive print is produced on said paper in which the difference in shade between the areas printed from said substantially clear and substantially opaque areas of the negative is just discernible to the naked eye, and then selecting which of said individual panels has been printed onto said paper as to be barely discernible.

2. The method of rating a photographic printing paper which comprises placing a test negative in an exposure apparatus, said test negative having a substantially clear light transmitting area, at least one area adjoining said substantially clear area which is slightly opaque, and a series of individual panels of progressively greater degrees of density, passing light through said substantially clear area, and adjustably presetting the brightness of said exposure apparatus until a predetermined intensity of light transmission is achieved, thereby to obtain a fixed reference, passing light through said series of individual panels successively to calibrate the relative amounts of light transmitted, producing a plurality of test prints of said negative on the paper to be rated, varying the times of exposure until a correctly exposed print is produced on said paper in which the difference in shade between the areas printed from said substantially clear and slightly opaque areas of the negative is just discernible to the naked eye, and then selecting the said one of said individual panels which has been printed onto said paper as to be barely discernible to fix the rating of the paper.

3. The photographic method of selecting a photographic paper for proper exposure of a particular negative to be printed which includes the steps of, placing a test negative in an exposure apparatus,
said test negative having a substantially clear light transmitting area and at least one area adjoining said substantially clear area which is slightly opaque, and a series of individual panels of progressively greater degrees of density, passing light through said substantially clear area and adjustably presetting the brightness of the exposure apparatus until a predetermined intensity of light transmission is achieved thereby to obtain a fixed reference, passing light through said series of individual panels successively to calibrate the relative amounts of light transmitted, producing a plurality of test prints of said negative on the paper to be rated,
varying the times of exposure until a correctly exposed print is produced on said paper in which the difference in shade between the areas printed from said substantially clear and slightly opaque areas of the negative is just discernible to the naked eye, then selecting the said one of said individual panels which has been printed onto said paper as to be barely discernible to fix the rating of the paper, placing the film negative to be printed in the exposure apparatus, adjusting the brightness of the exposure apparatus until the light transmitted through the clearest part of the negative to be printed is the same as the predetermined intensity when employing the test negative, selecting that portion of the negative of a density corresponding to a printed white tone, identifying the corresponding panel on the test negative, and then selecting a printing paper having the contrast characteristics and exposure time dictated by the evaluation of said negative.

4. A test negative comprising an annular row of panels consisting of individual plaques each being identical to the other in plane area and all being particularly characterized by the geometrical configuration of a rhomboid having a short leg and a long leg parallel to one another and a pair of non-parallel legs, all of the short legs facing radially inwardly and all of the long legs facing radially outwardly, each successive pair of panels being disposed in inverted relation with legs in parallel spaced adjacency, thereby forming a serrated pattern of panels with radially projecting apices, a centrally disposed panel concentrically inwardly of said annular row,
said centrally disposed panel comprising a slightly opaqued area superimposed on an area of completely clear film.

5. A test negative as defined in claim 4, said centrally disposed panel comprising inner and outer star-shaped areas.

6. A test negative as defined in claim 5, said star-shaped areas being circumferentially offset to dispose the points of the inner star area in alignment with the innermost apices of the outer star area.

7. The use of a test negative in pre-rating photographic printing paper having a specified manufacturer's time which includes the steps of presetting the brightness of an exposure apparatus through a test negative having a central slightly opaqued area superimposed on a clear area to fix a brightness standard, and exposing plural samples of the paper through said negative, said central area being surrounded by an annular row of panels of graduated density which row of panels is spaced concentrically outwardly of said central area and which exposures are made at corresponding plural exposure times having a plus and minus relationship to said specified time,
thereby to form plural prints,
selecting the print of said plural prints wherein the slightly opaqued area is discernibly distinct from the clear area on which it is superimposed,
and selecting by comparison inspection the lightest of the annular row of panels which is clearly defined by a fully discernible shape,
thereby to provide upper and lower range limits for the selected printing paper.

8. The use of a test negative in pre-rating photographic printing paper having a specified manufacturer's time which includes the steps of
exposing plural samples of the printing paper through a test negative having a central slightly opaqued area superimposed on a clear area and said central area being surrounded by an annular row of panels of rated graduated density which row of panels is spaced concentrically outwardly of said central area and which exposures are made at corresponding plural exposure times having a plus and minus relationship to said specified time,
thereby to form plural prints,
selecting the print of said plural prints wherein the slightly opaqued area is discernibly distinct from the clear area on which it is superimposed,
and measuring by comparison inspection the lightest of the annular row of panels which is clearly defined by a fully discernible shape,
thereby to provide upper and lower range limits for the selected printing paper,
thereafter printing specific negatives with the pre-rated printing paper by including the additional steps of placing a specific negative to be printed in an enlarger,
adjusting the enlarger intensity to a brightness corresponding to the clearest part of the film and to a preselected reference point on a projection densitometer scale,
thereby matching the part of the print that will print blackest to the slightly opaqued part of the test negative,
measuring the lightest part of the negative with a densitometer,
and matching the range dictated by the negative to an appropriately rated printing paper.

9. The use of a test negative having an isolated zone including a substantially clear area adjacent an area of just discernible opacity and having a series of panels of varying degrees of opacity in a selected usable density range separated from said isolated zone which includes the steps of
exposing plural samples of a selected printing paper through the test negative,
varying such exposures at correspondingly plural exposure times to form plural prints,
determining and selecting one of said plural prints on which said slightly opaqued area on said centrally disposed panel is clearly discernible,
and determining and selecting on that print the lightest panel which is defined by a clearly discernible shape,
thereby to provide a fixed rated range for that printing paper.

10. A test negative comprising
an exposed photographic negative having a centrally disposed slightly opaqued transmitting area,
said negative having areas adjoining said slightly opaqued area which are very substantially clear and together with said centrally disposed area forming a fixed brightness standard in an isolated zone,
and a plurality of panels of varying degrees of density surrounding said centrally disposed area and disposed in a concentric row to identify corresponding contrast variations in photographic papers.

11. A test negative as defined in claim 10 and further characterized by said centrally disposed opaqued area and said adjoining clear area being disposed in the form of inner and outer star-shaped areas.

12. A test negative as defined in claim 11 wherein said panels are disposed in an annular concentric row.

References Cited by the Examiner
UNITED STATES PATENTS
2,380,244   7/1945   Jones et al.

NORTON ANSHER, *Primary Examiner.*

R. A. WINTERCORN, *Assistant Examiner*